(12) United States Patent
Takizawa et al.

(10) Patent No.: US 11,108,312 B2
(45) Date of Patent: Aug. 31, 2021

(54) PERMANENT-MAGNET MOTOR INCLUDING V-SHAPED PERMANENT-MAGNET PAIRS

(71) Applicant: Mitsubishi Electric Corporation, Tokyo (JP)

(72) Inventors: Yuji Takizawa, Tokyo (JP); Yu Hirotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 345 days.

(21) Appl. No.: 16/071,931

(22) PCT Filed: May 10, 2016

(86) PCT No.: PCT/JP2016/063826
§ 371 (c)(1),
(2) Date: Jul. 23, 2018

(87) PCT Pub. No.: WO2017/195264
PCT Pub. Date: Nov. 16, 2017

(65) Prior Publication Data
US 2019/0058383 A1    Feb. 21, 2019

(51) Int. Cl.
*H02K 21/14*        (2006.01)
*H02K 1/27*         (2006.01)
(Continued)

(52) U.S. Cl.
CPC ............ *H02K 21/14* (2013.01); *H02K 1/148* (2013.01); *H02K 1/278* (2013.01); *H02K 1/2766* (2013.01); *H02K 29/03* (2013.01); *H02K 2213/03* (2013.01)

(58) Field of Classification Search
CPC .... H02K 21/14; H02K 29/03; H02K 2213/03; H02K 1/2766; H02K 1/148; H02K 1/278
See application file for complete search history.

(56) References Cited

U.S. PATENT DOCUMENTS 7,750,523 B2 * 7/2010 Nakayama ........... H02K 1/2766
                                                  310/156.53
7,868,501 B2 * 1/2011 Jonasson ............. H02K 1/2766
                                                  310/156.53
(Continued)

FOREIGN PATENT DOCUMENTS

CN        1713483 A     12/2005
CN      105634157 A      6/2016
(Continued)

OTHER PUBLICATIONS

Communication dated Dec. 4, 2019 by The State Intellectual Property Office of the People's Republic of China in application No. 201680085388.7.
(Continued)

*Primary Examiner* — Emily P Pham
(74) *Attorney, Agent, or Firm* — Sughrue Mion, PLLC; Richard C. Turner

(57) ABSTRACT

Each of a plurality of permanent-magnet pairs is configured with a pair of permanent magnets that are arranged in a v-shaped manner in such a way that the distance between the portions of the permanent magnets, facing each other at the outer side in the radial direction of the rotor core, is smaller than the distance between the portions thereof, facing each other at the inner side in the radial direction of the rotor core; a magnetic-field pole is formed of part, of the rotor core, that is situated between the adjacent permanent-magnet pairs.

2 Claims, 6 Drawing Sheets

(51) Int. Cl.
*H02K 1/14* (2006.01)
*H02K 29/03* (2006.01)

(56) References Cited

U.S. PATENT DOCUMENTS

| | | | |
|---|---|---|---|
| 2006/0017345 A1 | 1/2006 | Uchida et al. | |
| 2008/0018190 A1* | 1/2008 | Takahata | H02K 1/276 310/156.56 |
| 2008/0231135 A1 | 9/2008 | Suzuki et al. | |
| 2011/0266910 A1 | 11/2011 | Suzuki et al. | |
| 2012/0032539 A1 | 2/2012 | Hori et al. | |
| 2012/0038236 A1* | 2/2012 | Tajima | B60L 50/66 310/156.43 |
| 2012/0139386 A1 | 6/2012 | Murakami | |
| 2012/0169163 A1 | 7/2012 | Imai et al. | |
| 2012/0229066 A1 | 9/2012 | Nonaka | |
| 2012/0256508 A1 | 10/2012 | Suzuki et al. | |
| 2013/0113326 A1* | 5/2013 | Morishita | H02K 1/2766 310/156.53 |
| 2015/0130317 A1 | 5/2015 | Hung et al. | |
| 2015/0280502 A1 | 10/2015 | Hirotani et al. | |
| 2016/0036281 A1* | 2/2016 | Nakano | H02K 29/03 310/68 D |
| 2016/0087495 A1 | 3/2016 | Matsushita et al. | |
| 2017/0104376 A1* | 4/2017 | Nakagawa | H02K 1/2773 |

FOREIGN PATENT DOCUMENTS

| | | |
|---|---|---|
| EP | 2418756 A1 | 2/2012 |
| EP | 2463988 A2 | 6/2012 |
| EP | 3007323 A1 | 4/2016 |
| JP | 2005-080474 A | 3/2005 |
| JP | 2008-236890 A | 10/2008 |
| JP | 2012-157236 A | 8/2012 |
| JP | 5021247 B2 | 9/2012 |
| WO | 2011062064 A1 | 5/2011 |
| WO | 2014/136258 A1 | 9/2014 |

OTHER PUBLICATIONS

European Search Report dated Apr. 24, 2019 in EP Patent Application No. 16901613.6.
International Search Report of PCT/JP2016/063826 dated Jul. 5, 2016 [PCT/ISA/210].
Communication dated Nov. 5, 2019 from the Japanese Patent Office in application No. 2018-516240.
Communication dated Jun. 11, 2019 from the Japanese Patent Office in application No. 2018-516240.
Office Action dated May 3, 2021 from the European Patent Office in EP Application No. 16901613.6.

* cited by examiner

PERMANENT-MAGNET MOTOR INCLUDING V-SHAPED PERMANENT-MAGNET PAIRS

CROSS REFERENCE TO RELATED APPLICATIONS

This application is a National Stage of International Application No. PCT/JP2016/063826, filed May 10, 2016.

TECHNICAL FIELD

The present invention relates to a permanent-magnet motor provided with permanent magnets for forming magnetic-field poles and particularly to a permanent-magnet motor in which permanent magnets for forming magnetic-field poles are incorporated in the rotor.

BACKGROUND ART

As is well known, among permanent-magnet motors, a permanent-magnet motor in which permanent magnets for forming magnetic-field poles are embedded in the rotor is referred to as an IPM (Interior Permanent Magnet) motor; a permanent-magnet motor in which permanent magnets for forming magnetic-field poles are arranged in such a way as to be exposed on the outer circumferential surface of the rotor is referred to as a SPM (Surface Permanent Magnet) motor.

Patent Document 1 discloses a permanent-magnet motor, as an SPM motor, provided with multiplex multiphase armature windings, in which multiplexed armature windings share a magnetic path in the air gap between a magnetic-field pole and an armature. In the permanent-magnet motor disclosed in Patent Document 1, multiplexed armature windings share a magnetic path so as to be coupled with one another. The conventional permanent-magnet motor disclosed in Patent Document 1 is configured in such a way that phase difference control is applied to the multiplexed armature windings so that not only a torque ripple but also cogging torque is reduced.

In the conventional permanent-magnet motor disclosed in Patent Document 1, magnetic flux lines generated by energizing part of the multiplexed armature windings are interlinked with the other armature windings; thus, due to large mutual inductances, interference voltages are liable to be generated in the other armature windings. Because as described above, the interference voltages are generated in the respective multiplexed armature windings, the foregoing interference voltages, as disturbances, act on a current control system that applies vector control to the permanent-magnet motor. In a motor current control system in which the disturbance is suppressed by a feedback system, the interference voltage that is in proportion to a current differential value becomes larger and hence it becomes difficult for the current to converge on a target value, as the response frequency becomes higher. Therefore, because the feedback response frequency for cancelling a motor current ripple cannot be set to be high, there has been a problem that the torque ripple caused by the current ripple cannot be reduced and hence the vibration and the noise sound of the motor are enlarged.

Patent Document 2 discloses a permanent-magnet motor, as an SPM motor, provided with multiplex multiphase armature windings, in which multiplexed armature windings do not share a magnetic path in the air gap between a magnetic-field pole and an armature. The conventional permanent-magnet motor disclosed in Patent Document 2 is configured in such a way that phase difference control is applied to the multiplexed armature windings so that not only a torque ripple but also cogging torque is reduced; thus, it is made possible to suppress interference voltages from being generated in multiplexed armature windings, and not only the torque ripple but also the cogging torque is reduced.

In the conventional permanent-magnet motor disclosed in Patent Document 2, the mutual inductances between the multiplexed armature windings become small; however, because for example, in the case where electric currents having respective phases different from one another by 30° [electric angle] are applied to the multiplexed armature windings, the torque ripple of the 6th component in terms of the electric angle cannot be cancelled, there has been a problem that the vibration and the noise sound are enlarged.

Furthermore, Patent Document 3 discloses a permanent-magnet motor, as an IPM motor, provided with multiplex multiphase armature windings, in which multiplexed armature windings are provided and slits are provided in the surface of the rotor core so that the mutual inductances between the multiplexed armature windings are reduced. The conventional permanent-magnet motor disclosed in Patent Document 3 is configured in such a way that phase difference control is applied to the multiplexed armature windings so that not only a torque ripple but also togging torque is reduced; thus, it is made possible to suppress interference voltages from being generated in multiplexed armature windings, and not only the torque ripple but also the togging torque is reduced.

Because in the conventional permanent-magnet motor disclosed in Patent Document 3, slits are provided in the surface of the rotor core, the mutual inductances to be coupled with each other in such a way as to transverse the surface of the rotor core in the circumferential direction of the rotor core can be reduces by the slits, and hence it is made possible to suppress the interference voltages from being generated in the multiplexed armature windings; however, in a permanent-magnet motor in which the amount of permanent magnet to be embedded in the rotor core is increased so that the magnetomotive force of the rotor is enlarged, the magnetic path is narrowed in proportion to the existence of the slit in the surface of the rotor core and hence the rotor core is liable to be magnetically saturated; thus, there has been a problem that because harmonic waves are superimposed on the magnetomotive force of the rotor, a torque ripple is produced and thence the vibration and the noise sound of the motor are enlarged.

PRIOR ART REFERENCE

Patent Document

[Patent Document 1] Japanese Patent Application Laid-Open No. 2012-157236
[Patent Document 2] Japanese Patent Publication No. 5021247
[Patent Document 3] international Publication No. WO2014/136258A1

DISCLOSURE OF THE INVENTION

Problems to be Solved by the Invention

In a conventional permanent-magnet motor provided with multiplex multiphase armature windings, because as described above, due to the mutual inductances between the multiplexed armature windings, the interference voltages are generated in the respective multiplexed armature windings, the foregoing interference voltages, as disturbances, act on a current control system that applies vector control to the permanent-magnet motor; in a motor current control system in which the disturbance is suppressed by a feedback system, the interference voltage that is in proportion to a current differential value becomes larger and hence it becomes difficult for the current to converge on a target value, as the response frequency becomes higher; therefore, because the feedback response frequency for cancelling a motor current ripple cannot be set to be high, there has been a problem that the torque ripple caused by the current ripple cannot be reduced and hence the vibration and the noise sound of the motor are enlarged.

The present invention has been implemented in order to solve the foregoing problems in a conventional permanent-magnet motor; the objective thereof is to provide a permanent-magnet motor that reduces the mutual inductances between the multiplexed armature windings so that the interference voltages can be suppressed.

Means for Solving the Problems

A permanent-magnet motor according to the present invention includes a stator provided with a stator core having a plurality of teeth and a plurality of slots and an armature winding having a plurality of multiphase windings that are wound around the teeth and are contained in the slots, and a rotor provided with a rotor core facing the stator core via a predetermined air gap, a plurality of permanent magnets embedded in the rotor core, and a plurality of magnetic-field poles; the permanent-magnet motor is characterized in that the plurality of permanent magnets form a plurality of permanent-magnet pairs in each of which end surface portions having a different polarity substantially face each other, in that each of the permanent-magnet pairs is configured with a pair of the permanent magnets that are arranged in a v-shaped manner in such a way that the distance between the portions of the permanent magnets, facing each other at the outer side in the radial direction of the rotor core, is smaller than the distance between the portions thereof, facing each other at the inner side in the radial direction of the rotor core, and in that the magnetic-field pole is formed of part, of the rotor core, that is situated between the adjacent permanent-magnet pairs.

Advantage of the Invention

In the permanent-magnet motor according to the present invention, the plurality of permanent magnets form a plurality of permanent-magnet pairs in each of which end surface portions having a different polarity substantia substantially face each other; each of the permanent-magnet pairs is configured with a pair of the permanent magnets that are arranged in a v-shaped manner in such a way that the distance between the portions of the permanent magnets, facing each other at the outer side in the radial direction of the rotor core, is smaller than the distance between the portions thereof, facing each other at the inner side in the radial direction of the rotor core; the magnetic-field pole is formed of part, of the rotor core, that is situated between the adjacent permanent-magnet pairs. As a result, it is made possible to provide a multiplex multiphase winding permanent-magnet motor, for an electric power steering, whose output is high and whose vibration and noise sound are small.

BEST MODE FOR CARRYING OUT THE INVENTION

Embodiment 1

Figure 1:
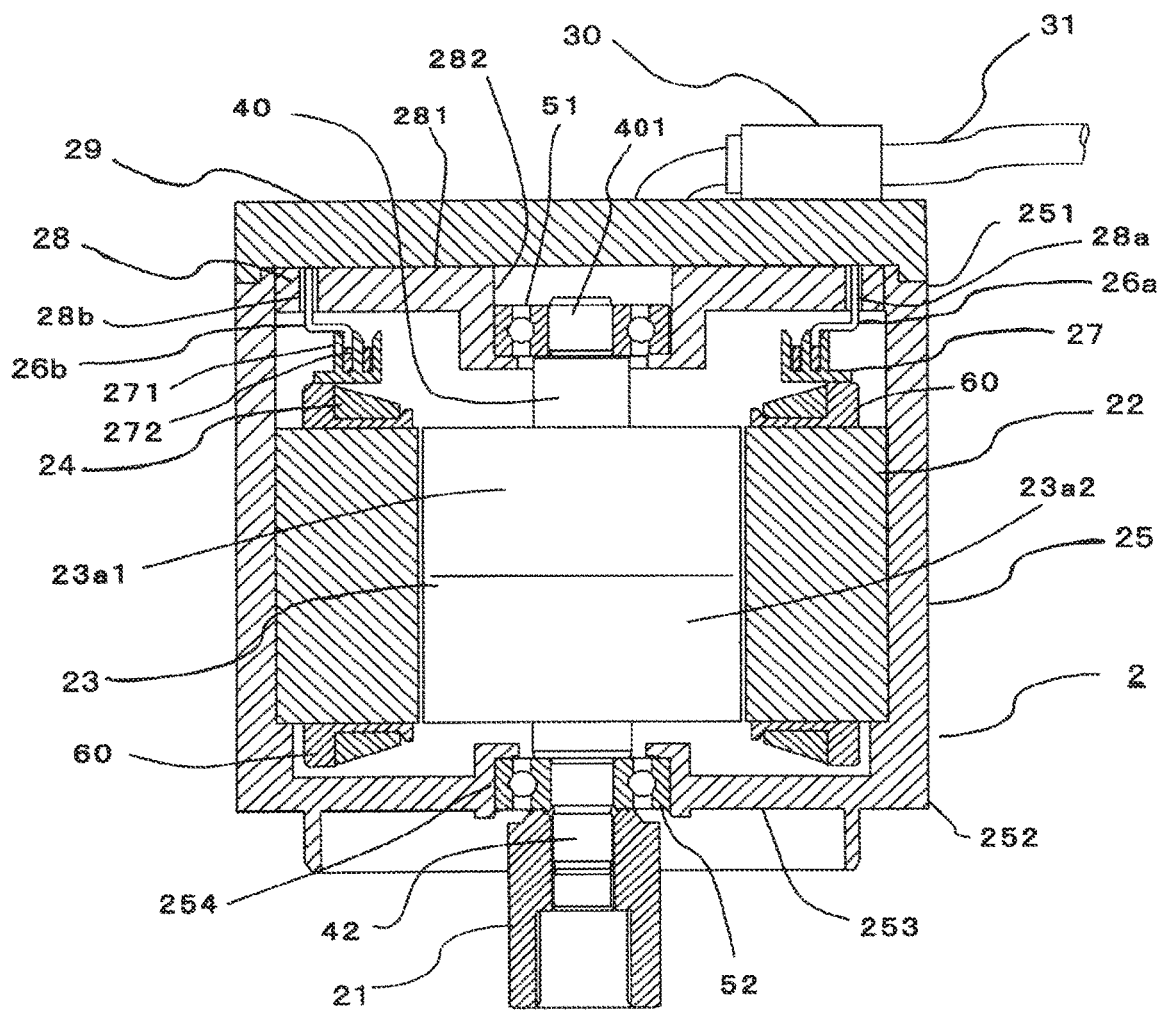
FIG. 1 is an axle-direction cross-sectional view of a permanent-magnet motor according to Embodiment 1 of the present invention.

Hereinafter, a permanent-magnet motor according to Embodiment 1 of the present invention will be explained in detail with reference to the drawings. FIG. 1 is an axle-direction cross-sectional view of the permanent-magnet motor according to Embodiment 1 of the present invention. The permanent-magnet motor illustrated in FIG. 1 is utilized, for example, in an electric power steering apparatus for a vehicle.

The permanent-magnet motor (simply referred to as a motor, hereinafter) 2 illustrated in FIG. 1 is an IPM motor; when roughly categorized, the motor 2 is provided with a motor case 25 formed in the shape of a cylindrical tube, a stator 22 fixed on the inner circumferential surface of the motor case 25, a rotor 23 disposed in such a way that the outer circumferential surface thereof faces the inner circumferential surface of the stator 22 through a predetermined gap, a rotor axle 40 on which the rotor 23 is fixed, a frame 28 that is fixed to the motor case 25 in such a way that the outer circumferential surface thereof abuts on the inner circumferential surface of one axle-direction end portion 251 of the motor case 25, and a bracket 29 that is fixed to the one axle-direction end portion 251 of the motor case 25 in such a way as to abut on one axle-direction endface 281 of the frame 28.

The frame 28 is disposed in such a way as to seal the one axle-direction end portion 251 of the motor case 25, which is opened, and is fixed to the motor case 25 in such a way that the outer circumferential surface thereof abuts on the inner circumferential surface of the motor case 25. A first bearing 51 is held by the frame 28 in such a way as to be inserted into a through-hole 282 provided in the radial-direction central portion of the frame 28. A wall portion 253 that seals the other end portion 252 of the motor case 25 is formed integrally with the motor case 25. A second bearing 52 is held by the wall portion 253 in such a way as to be inserted into a through-hole 254 provided in The radial-direction central portion of the wall portion 253 of the motor case 25.

One axle-direction end portion 41 of the rotor axle 40 is pivotably supported by the first bearing 51, and the other axle-direction end portion 42 of the rotor axle 40 is pivotably supported by the second bearing 52. An output axle 21 is fixed to the other axle-direction end portion 42 of the rotor axle 40 and is coupled with, for example, a speed reducing mechanism (unillustrated).

The stator 22 has a stator core 22a formed of a large number of electromagnetic steel sheets stacked in the axle direction and an armature winding 24 mounted on the stator core 22a in an after-mentioned manner. The armature winding 24 is configured with two groups of 3-phase windings, which are formed in substantially the same manner. The rotor 23 has a rotor core 23a formed of a large number of electromagnetic steel sheets stacked in the axle direction and after-mentioned permanent magnets, for two or more pairs of poles, that are embedded in the rotor core 23a. The rotor 23 is fixed on the rotor axle 40 in such a way that the radial-direction central portion thereof is penetrated by the rotor axle 40. The rotor core 23a is configured with a first rotor core 23a1 and a second rotor core 23a2 that are formed in one and the same manner; the first rotor core 23a1 and the second rotor core 23a2 are provided with a configuration in which these rotor cores are coupled with each other in the axis direction in a series manner and in such a manner that the angular positions thereof with respect to the center axis are shifted from each other, i.e., provided with a so-called 2-step-skew configuration. For example, in the case of a 2-step-skew configuration in which the first rotor core 23a1 and the second rotor core 23a2, configured in one and the same manner, are coupled with each other in the axle direction in such a manner that the angular positions thereof with respect to she center axis are shifted from each other by 3.75° [mechanical angle], the 12th component[electric angle] of the torque ripple can be reduced; thus, it is made possible to obtain a permanent-magnet motor with a small torque ripple.

A connection ring 27 has a holder 271 formed of an insulator in a ring-shaped manner and two or more ring-shaped connecting conductors 272 that are fixed to the holder 271 in such a way as to be inserted into respective recessed grooves formed in the holder 271. The connection ring 27 is disposed in the immediate vicinity of the armature winding 24 and is fixed to a supporting body 60 fixed to the one axle-direction end portion of the stator 22.

The supporting bodies 60 formed of an insulator are fixed to the both respective axis-direction end portions of the stator 22, and each of the supporting bodies 60 supports the axle-direction end portion of the armature winding 24. Each of the two groups of 3-phase armature windings included in the armature winding 24 is 3-phase-Δ-connected or 3 phase-Y-connected by means of the connection ring 27.

One ends of first winding end portions 26a including three conductors are connected, through the intermediary of the connecting conductors 272 of the connection ring 27, with corresponding respective windings of one of the two groups of 3-phase armature windings; the other ends thereof are connected, through the intermediary of first through-holes 28a in the frame 28 and through-holes (unillustrated) in the bracket 29, with a connector 30.

One ends of second winding end portions 26b including three conductors are connected, through the intermediary of the connecting conductors 272 of the connection ring 27, with corresponding respective windings of the other one of the two groups of 3-phase armature windings; the other ends thereof are connected, through the intermediary of second through-holes 28b in the frame 28 and through-holes (unillustrated) in the bracket 29, with the connector 30. The connector 30 is fixed to the bracket 29 and connects the first winding end portions 26a and the second winding end portions 26b with an electric power converter (unillustrated) such as an inverter, through the intermediary of a cable 31.

Figure 2:
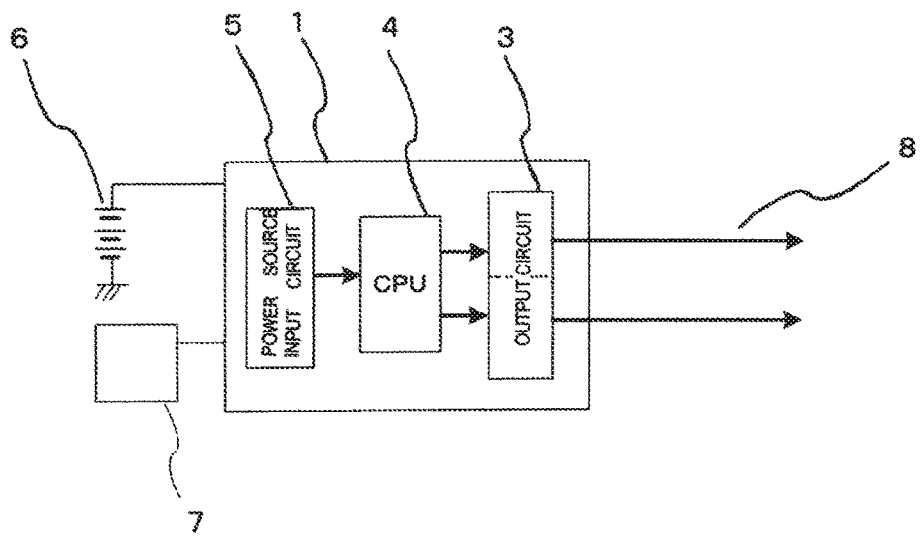
FIG. 2 is an explanatory diagram of a control unit in the permanent-magnet motor according to Embodiment 1 of the present invention.

Next, there will be explained a control unit that controls the permanent-magnet motor configured as described above. FIG. 2 is an explanatory diagram of a control unit in the permanent-magnet motor according to Embodiment 1 of the present invention. In FIG. 2, a control unit 1 is provided with a power source/input circuit 5, a CPU (central processing unit) 4 that calculates a control amount, and an output circuit 3.

The power source/input circuit 5 is connected with an external power source 6 such as a battery mounted in a vehicle or the like and includes a power source circuit that supplies electric power from the external power source 6 to the CPU 4 and the output circuit 3 and an input circuit to be connected with various kinds of sensors 7 provided in a vehicle or the like.

The CPU 4 calculates a control amount for controlling the output of the output circuit, based on various kinds of information pieces, for example, information pieces such as a vehicle speed and steering torque to be inputted thereto from the various kinds of sensors 7 by way of the power source/input circuit 5; then, the CPU 4 provides the control amount to the output circuit 3. The output circuit 3 is provided with an electric-power conversion circuit including a 3-phase bridge circuit configured with, for example, a plurality of switching devices; the output circuit 3 is supplied with electric power from the external power source 6 by way of the power source/input circuit 5 and generates a 3-phase output current controlled based on the control amount calculated by the CPU 4.

The output current outputted from the output circuit 3 of the control unit 1 is supplied to the cable 31 illustrated in FIG. 1, by way of a harness 8. The output current, outputted from the output circuit 3, that is supplied to the cable 31 is supplied to the one of 3-phase armature windings included in the armature winding 24, by way of the connector 30 and the first winding end portion 26a, Similarly, the output current, outputted from the output circuit 3, that is supplied to the cable 31 is supplied to the other one of 3-phase armature windings included in the armature winding 24, by way of the connector 30 and the second winding end portion 26b.

As described above, in the control unit 1, the various kinds of information pieces from the sensors 7 are transferred to the CPU 4 by way of the power source/input circuit 5; a control amount is calculated and outputted to the output circuit 3; then, the output circuit 3 supplies a 3-phase current to the armature winding 24 of the motor 2. In this situation, the respective windings in each of the one of and the other one of the 3-phase armature windings included in the armature winding 24 are supplied with phase currents whose phases are different from one another, by 120°; moreover, the one of and the other one of the 3-phase armature windings are supplied with 3-phase currents whose phases are different from each other, for example, by 30° (electric angle). Because the control unit 1 controls the driving of the output circuit 3, based on a control amount calculated by the CPU 4, it is made possible to perform various kinds of motor controlling actions such as control of the rotation speed of the output axle 21 of the motor 2 and control of the output torque.

Figure 3:
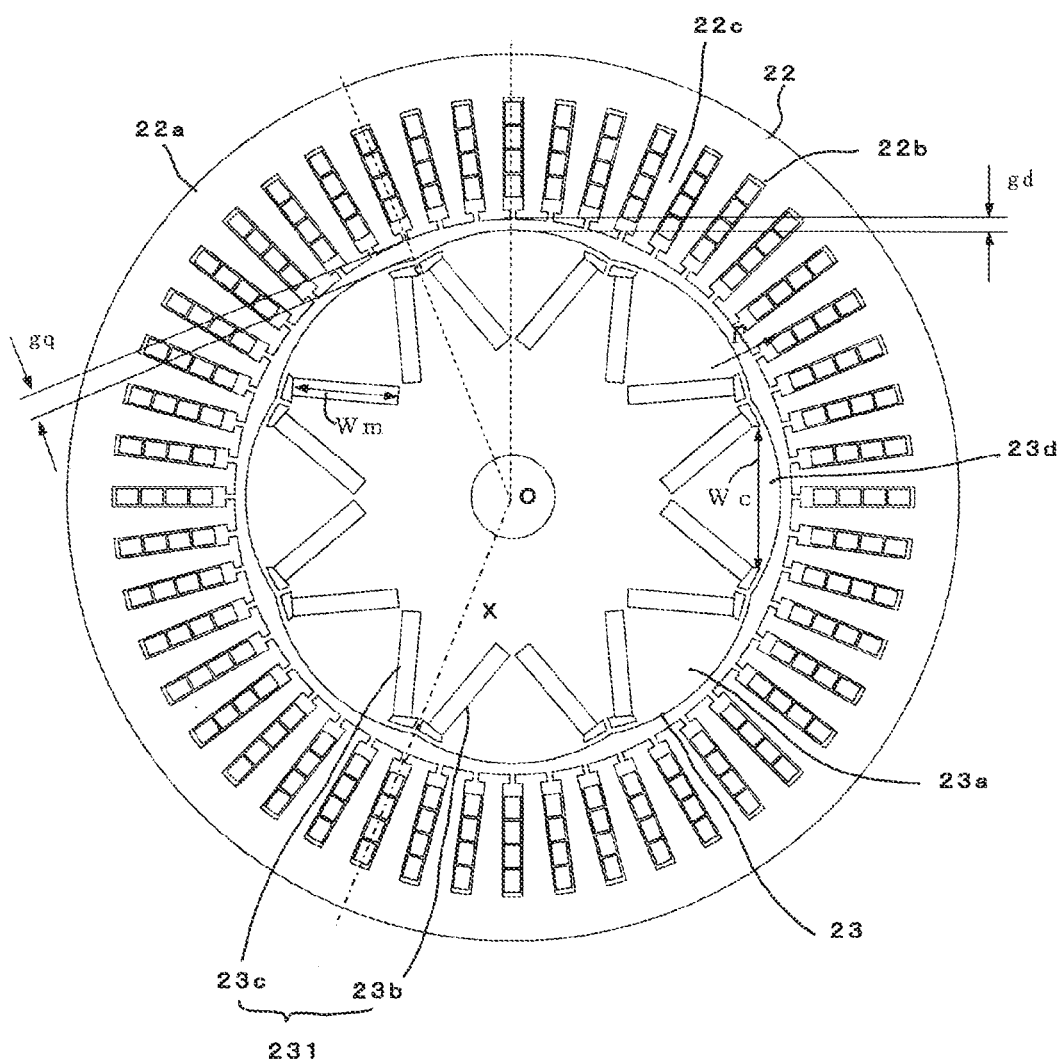
FIG. 3 is a cross-sectional view of the permanent-magnet motor according to Embodiment 1 of the present invention, when viewed in a direction perpendicular to the axle direction.

FIG. 3 is a cross-sectional view of the permanent-magnet motor according to Embodiment 1 of the present invention, taken along a plane perpendicular to the axle direction. In FIG. 3, the armature winding 24 mounted in the stator 22 includes a first armature winding and a second armature winding. Although not illustrated, an insulation paper sheet or the like is inserted between a winding conductor 24a included in the armature winding 24 and the stator core 22a, so that electrical insulation between the stator core 22a and the winding conductor 24a is secured. As described later, totally 48 pieces of teeth 22c are formed; thus, the number of slots 22b is also 48. Four pieces of winding conductors 24a of the armature winding are contained in each of the slots 22b.

The first armature winding includes 3-phase windings of U1, V1, and W1 phases; the second armature winding includes 3-phase windings of U2, V2, and W2 phases. The arrangement of the armature winding 24 is implemented in such a way that in the slots from the first slot to the sixth slot respective windings of U1 phase, U2 phase, W1 phase, W2 phase, V1 phase, and V2 phase are arranged in that order; also in the slots including and after the seventh slot, the respective windings of U1 phase, U2 phase, W1 phase, W2 phase, V1 phase, and V2 phase are arranged in that order, i.e., up to the 48th slot, the respective windings of U1 phase, U2 phase, W1 phase, W2 phase, V1 phase, and V2 phase are arranged in the same order.

In this regard, however, for example, U1 phase in the first slot and U1 phase in the seventh slot are arranged in such a way that the respective directions of the currents thereof are opposite to each other. In other words, there is utilized a distributed-winding configuration in which winding is implemented around the slots from the first one to the seventh one; the armature winding lies across totally six teeth. This corresponds to 180° (electric angle); the short-node winding coefficient becomes "1". Furthermore, because the first armature winding and the second armature winding are driven with the respective phases that are different from each other by 30° (electric angle), the distributed-winding coefficient becomes "1" and hence the winding coefficient becomes "1"; therefore, a small-size high-torque motor can be obtained, and hence there is demonstrated an effect that in comparison with a motor having a small winding coefficient, it is made possible to realize reduction of the usage amount of permanent-magnet material and cost saving.

As described above, the rotor core 23a is configured with a large number of electromagnetic steel sheets that are stacked in the axle direction; eight through-hole pairs 231 that each includes a first through-hole 23b and a second through-hole 23c, arranged symmetrically and each slanted at a predetermined angle with respect to a radial-direction straight line X intersecting the center axis O of the rotor core 23a, are arranged in steps of 45° around the center axis. Each of the eight through-hole pairs 231 is disposed in a v-shaped manner in such a way that the distance between the portions of the through-holes, facing each other at the outer side in the radial direction of the rotor core 23a, is smaller than the distance between the portions thereof, facing each other at the inner side in the radial direction of the rotor core 23a. Each of the through-holes has a cross-sectional shape that is substantially a rectangle having a pair of long-side portions facing each other and a pair of short-side portions facing each other. Respective permanent magnets (unillustrated) whose cross sections are each formed substantially in the shape of a rectangle are inserted into the first through-hole 23b and the second through-hole 23c in each of the eight through-hole pairs 231. The permanent magnet is formed of, for example, a neodymium rare-earth permanent magnet whose cross section is in the shape of a flat plate The permanent-magnet motor according to Embodiment 1 of the present invention, illustrated in FIG. 3, is a permanent-magnet motor, as an 8-pole IPM motor in which 2 permanent magnets facing each other in a V-shaped manner are provided for each magnetic-field pole 23d, i.e., totally 16 permanent magnets are arranged.

Figure 8:
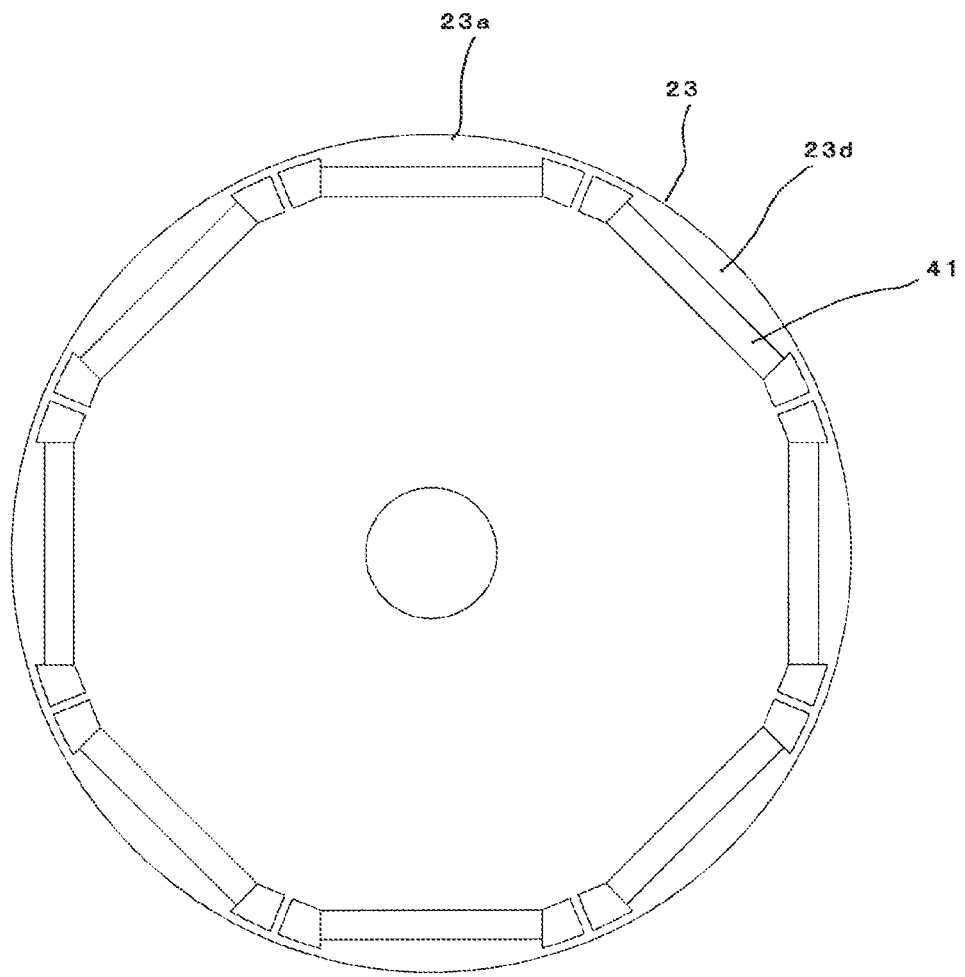
FIG. 8 is an explanatory view of a conventional permanent-magnet motor.

A conventional permanent-magnet motor illustrated in FIG. 8 is a permanent-magnet motor, as an IPM motor, in which each of permanent magnets 41 is embedded in the rotor core 23a in such a way that the longitudinal side and the transverse side thereof are along the circumferential direction and the radial direction, respectively, and in which the end surface portion forming the magnetic pole of each of the permanent magnets 41 is disposed in such a way as to face the air gap between the stator 22 and the rotor 23. In the case where in contrast to the conventional permanent-magnet motor illustrated in FIG. 8, the same permanent magnets, both end surface portions forming the longitudinal sides of each of which are magnetized so as to become the N pole and the S pole, are utilized in the permanent-magnet motor according to Embodiment 1 of the present invention, the volume of the magnetic-field pole 23d of the permanent-magnet motor according to Embodiment 1 of the present invention becomes larger than the volume of the magnetic-field pole 23d of the conventional permanent-magnet motor illustrated in FIG. 8; therefore, a higher-torque motor can be obtained.

The rotor core 23a is formed not as a perfect circle having a uniform radius from the center axis o but as a so-called flower circle in which the radius of the magnetic-field pole 23d is minimum and the radius of the circumferential-direction central portion of the magnetic-field pole 23d is maximum. Thus, a q-axis direction air gap gq, which is an air gap between the outer circumferential surface of the boundary portion between the adjacent magnetic-field poles 23d and the front-end portion of the teeth. 22c in the stator core 22a, is larger than a d-axis direction air gap gd, which is an air gap between the outer circumferential surface of the circumferential-direction central portion of the magnetic-field pole 23d and the front-end portion of the teeth 22c in the stator core 22a. As described above, because the cross-sectional shape of the rotor core 23a is not a perfect circle but a flower circle, the torque ripple can be reduced and hence it is made possible to obtain a permanent-magnet motor with a small torque ripple.

As described above, the rotor core 23a is provided with a configuration in which two rotor cores, formed in one and the same manner, are coupled with each other in the axis direction in a series manner and in such a manner that the angular positions thereof with respect to the center axis are shifted from each other, i.e., provided with a so-called 2-step-skew configuration; for example, in the case of a 2-step-skew configuration in which the rotor cores, configured in one and the same manner, are coupled with each other in the axle direction in such a manner that the angular positions thereof with respect to the center axis are shifted from each other by 3.75° [mechanical angle], the 12th component [electric angle] of the torque ripple can be reduced; thus, it is made possible to obtain a permanent-magnet motor with a small torque ripple.

Figure 4:
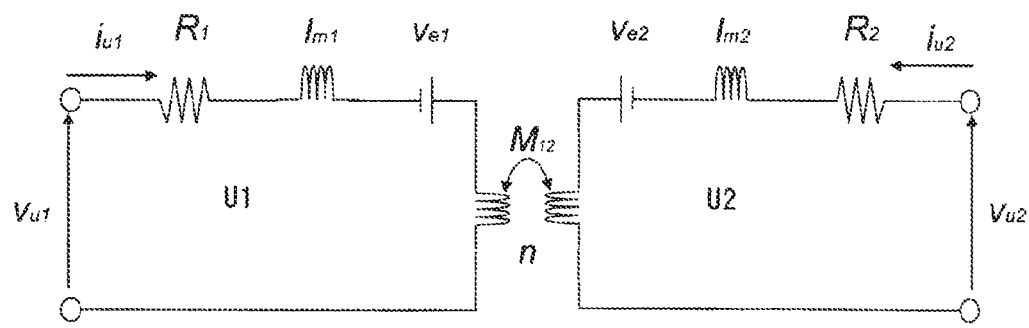
FIG. 4 is an explanatory diagram representing an equivalent circuit of armature windings of the permanent-magnet motor according to Embodiment 1 of the present invention.

Here, the configuration of the armature winding 24 will be explained. FIG. 4 is an explanatory diagram representing an equivalent circuit of the armature windings of the permanent-magnet motor according to Embodiment 1 of the present invention; FIG. 4 represents the equivalent circuit including the winding U1 of the first armature winding and the winding U2 of the second winding group among the three-phase windings in the double-arranged Δ-connection or Y-connection. In the winding U1 represented in FIG. 4, vu1, iu1, R1, ve1, and lm1 are an inter-terminal voltage, an electric current, a resistance, an induction voltage, and a leakage inductance, respectively. In the winding U2, vu2, iu2, R2, ve2, and lm2 are an inter-terminal voltage, an electric current, resistance, an induction voltage, and a leakage inductance, respectively. M12 and n denote a mutual inductance and the turn ratio of the winding U1 to the winding U2, respectively. As described above, the equivalent circuit for the winding U1 of the first winding group and the winding U2 of the second winding group among the three-phase windings in the double-arranged Δ-connection or Y-connection is similar to the equivalent circuit of a transformer.

Unlike values utilized in normal motor control, especially the leakage inductances lm1 and lm2 and M12 among the values indicated in. FIG. 4 are the inductances between multiple-two-phase windings that are arranged in parallel with each other. In general, in a multiplex multiphase winding AC motor having multiplexed windings, the parallel windings are the same in the number of turns of the winding; thus, n is "1". Moreover, the respective equivalent circuits for the windings V1 and V2, the windings W1 and W2, the windings U1 and V2, the windings U1 and W2, the windings V1 and U2, the windings V1 and W2, the windings W1 and U2, and the windings W1 and V2 are the same as the equivalent circuit in FIG. 4; therefore, in the case where the characteristics of the three phases are equal to one another and coordinate transformation from the U phase, the V phase, or the W phase of the three phases into the magnetic-field-pole d axis or q axis, the respective equivalent circuits on the d axis and the q axis are the same as the equivalent circuit represented in FIG. 1.

Figure 5:
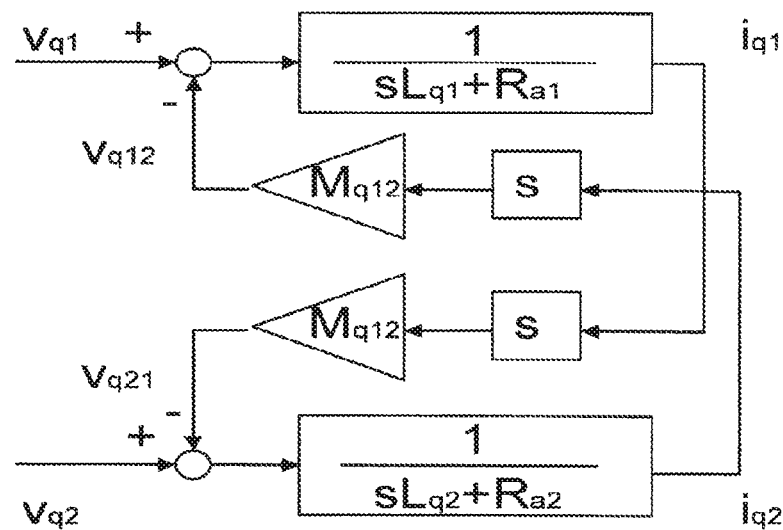
FIG. 5 is an explanatory diagram for explaining a q-axis circuit configuration of the permanent-magnet motor according to Embodiment 1.

As described above, because in general, being magnetically coupled with one another, plural groups of windings in a multiplex multiphase winding AC motor having multiplexed windings cause interference voltages one another. In the case where the equivalent circuit of a three-phase multiple winding motor having the U phase, the V phase, and the W phase is coordinate-transformed into the magnetic-field-pole d axis and q axis, the configurations of the equivalent circuits of the respective phases are the same as the equivalent circuit in FIG. 4, as described above; FIG. 5 is the q-axis equivalent circuit represented by a block diagram.

In other words, FIG. 5 is an explanatory diagram for explaining the q-axis circuit configuration of the permanent-magnet motor according to Embodiment 1 of the present invention. In FIG. 5, vq1 and vq2 are the q-axis voltages of the first winding group and the second winding group, respectively; iq1 and iq2 are the q-axis currents of the first winding group and the second winding group, respectively; Lq1 and Lq2 are the q-axis components of the self-inductances of the first winding group and the second winding group, respectively; Ra1 and Ra2 are the resistance components of the windings of the first winding group and the second winding group, respectively; Mq12 is the q-axis component of the mutual inductance that represents the interference between the respective windings of the first winding group and the second winding group. The self-inductance is the summation of the leakage inductance and the mutual inductance.

In FIG. 5, each of the voltages represented by vq12 and vq21 denotes an interference voltage from the winding of another group. The character "s" in FIG. 3 denotes the differential operator of a Laplace transformation. FIG. 5 represents the equivalent circuit on the q-axis of the magnetic-field pole; however, as can be seen from the foregoing explanation, the equivalent circuit on the q-axis of the magnetic-field pole has also the same configuration as that of FIG. 4.

In general, in vector control of an AC motor, current control is implemented independently on the d axis and the q axis of the magnetic-field pole; however, in the foregoing multiplex multiphase winding AC motor having windings multiplexed as described above, the interference voltages act on each other and hence act, as a disturbance, on the current control system. Because as evident from FIG. 5, being proportional to the differential value of the winding current, the interference voltage has a nature of becoming higher as the current responds faster; thus, unlike the current control of a conventional single-winding motor, the responsiveness of the current control system cannot be raised; moreover, the foregoing interference voltage causes ripple components in the current and hence there has been a problem that a torque ripple is produced. However, the permanent-magnet motor, as a multiplex multiphase winding AC motor, according to Embodiment 1 of the present invention can solve these problems in multiplex multiphase windings.

The permanent-magnet motor according to Embodiment 1 of the present invention is controlled by use of a vector control method; the first armature winding and the second armature winding are independently current-controlled on the magnetic-field-pole dq axis. However, as described above, in the multiplex multiphase winding AC motor having multiplexed windings, the interference voltages act on each other and act, as disturbance values iq11 and iq21, on the current control system. From the q-axis equivalent-circuit block diagram in FIG. 5, the disturbance values iq11 and iq21 are given by the equations (1) and (2) below.

$$i_{q11} = -\frac{sM_{q12}i_{q2}}{R_{a1} + sL_{q1}} \quad (1)$$

$$i_{q21} = -\frac{sM_{q12}i_{q1}}{R_{a2} + sL_{q2}} \quad (2)$$

In the above equations, iq1 and iq2 are the respective q-axis currents in the windings of the first winding group and the second winding group; Ra1 and Ra2 are the respective resistance values of the windings of the first winding group and the second winding group; Lq1 and Lq2 are the respective q-axis components of the self-inductances of the windings in the first winding group and the second winding group; Mq12 is the q-axis component of the mutual inductance that represents the interference between the windings in the first winding group and the second winding group. Accordingly, when the frequency of the current control is high, the differential operator s of the Laplace transformation becomes large; therefore, from the equations (1) and (2), it is clear that the disturbance values iq11 and ig21 depend on the magnetic coupling component Mq12/Lq1 and the magnetic coupling component Mq12/Lq2, respectively. In the case where these magnetic coupling components become large, the disturbance values iq11 and iq21 increase and hence the disturbance to the current control system is enlarged. When the disturbance becomes large, the responsiveness of the current control system cannot be raised and hence ripple components is produced in the current; then, a torque ripple is caused.

With regard to the foregoing d-axis direction air gap gd and the q-axis direction air gap gq, in the case of the permanent-magnet motor, as the foregoing conventional IPM motor illustrated in FIG. 8, gd is the same as gq; in contrast, in the case of the permanent-magnet motor, as an IPM motor, according to Embodiment 1 of the present invention illustrated in FIG. 3, gd is smaller than gq; thus, the q-axis direction magnetic resistance becomes large and hence it becomes difficult for magnetic flux to flow. Accordingly, the q-axis direction mutual inductance Mq is smaller than that of the conventional IPM motor. However, because the leakage inductance does not change, the self-inductance Lq does not decrease so much as the mutual inductance Mg; as a result Mq/Lq can be reduced and hence the torque ripple can be decreased.

Moreover, because as described above, the permanent magnets are arranged in a V-shaped manner, the volume of the magnetic-field pole becomes large and hence the value of magnetic saturation of the rotor core becomes large; thus, the mutual inductance Mc that circles in the rotor core via the air gap can also be reduced. Accordingly, in the permanent-magnet motor according to Embodiment 1 of the present invention, which is an IPM motor in which as described above, the shape of the rotor is a so-called flower circle and the permanent magnets are arranged in a V-shaped manner, both the q-axis direction air gap and the magnetic saturation of the rotor reduce the mutual inductance Mg; therefore, especially Mq/Lq can be reduced and hence the torque ripple can be decreased.

Embodiment 2

Figure 6:
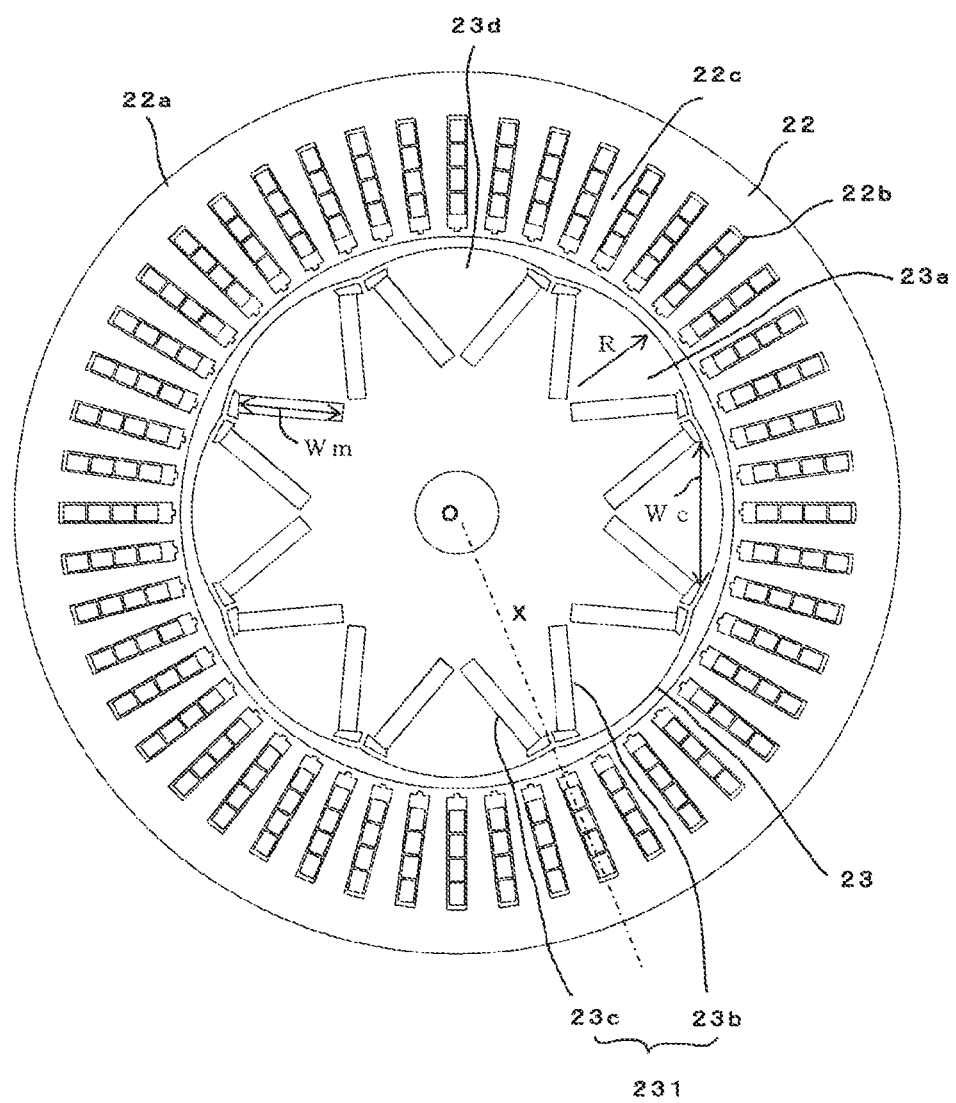
FIG. 6 is an axle-direction cross-sectional view of a permanent-magnet motor according to Embodiment 2 of the present invention.

FIG. 6 is a cross-sectional view of a motor according to Embodiment 2 of the present invention. In FIG. 6, the respective front-end portions of adjacent teeth 22c of the stator core 22a are coupled with one another. The other configurations are the same as those in Embodiment 1. Because the respective front-end portions of the adjacent teeth 22c are coupled with one another, magnetic flux flows in the stator core 22a via the connection portions; thus, because the mutual inductance becomes large, the interference voltage becomes large and hence the torque ripple is liable to be deteriorated. However, because the rotor 23 is configured in the same manner as the rotor 23 of foregoing Embodiment 1 illustrated in FIG. 3, the magnetic coupling can be reduced even in the case of a high-torque high-output motor; thus, there is demonstrated an effect that the torque ripple does not become large.

That is to say, in FIG. 6, the rotor core 23a is configured with a large number of electromagnetic steel sheets that are stacked in the axle direction; eight through-hole pairs 231 that each includes a first through-hole 23b and a second through-hole 23c, arranged symmetrically and each slanted at a predetermined angle with respect to a radial-direction straight line X intersecting the center axis O of the rotor core 23a, are arranged in steps of 45° around the center axis O. Each of the eight through-hole pairs 231 is disposed in a v-shaped manner in such a way that the distance between the portions of the through-holes, facing each other at the outer side in the radial direction of the rotor core 23a, is smaller than the distance between the portions thereof, facing each other at the inner side in the radial direction of the rotor core 23a. Each of the through-holes has a cross-sectional shape that is substantially a rectangle having a pair of long-side portions facing each other and a pair of short-side portions facing each other. Respective permanent magnets (unillustrated) whose cross sections are each formed substantially in the shape of a rectangle are inserted into the first through-hole 23b and the second through-hole 23c in each of the eight through-hole pairs 231.

The permanent-magnet motor according to Embodiment 2 of the present invention, illustrated in FIG. 6, is a permanent-magnet motor, as an 8-pole IPM motor in which 2 permanent magnets facing each other in a V-shaped manner are provided for each magnetic-field pole 23d, i.e., totally 16 permanent magnets are arranged.

Figure 7:
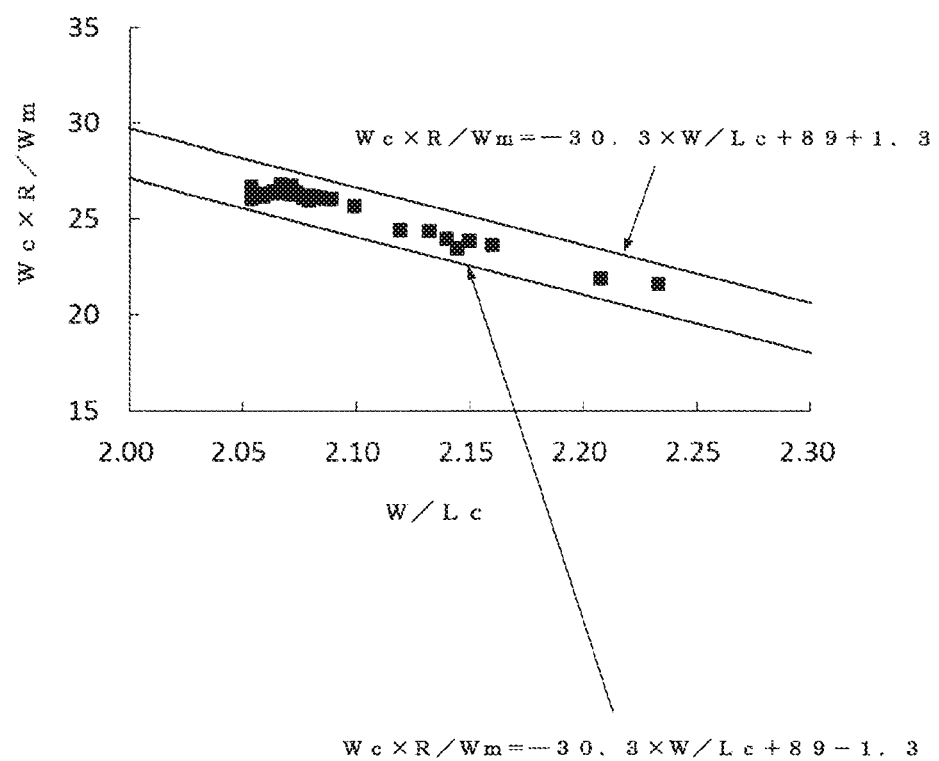
FIG. 7 is an explanatory graph for the permanent-magnet motor according to Embodiment 2 of the present invention.

FIG. 7 is an explanatory graph for the permanent-magnet motor according to Embodiment 2 of the present invention. It is assumed that R[mm] denotes the length of the outer circumference of the rotor core 23a, Wc [mm] denotes the circumferential-direction maximum width, at the foregoing magnetic pole 23d, of the rotor, Lc [mm] denotes the axle-direction length of the permanent magnet, Wm[mm] denotes the length of the permanent magnet in a direction perpendicular to the axle direction, and W[g] denotes the total weight of the permanent magnets for forming one piece of the magnetic-field pole 23d. In the case of Embodiment 2, because two permanent magnets are provided for one piece of magnetic-field pole 23d, the equation [W=magnet width×Wm×2×Lc×magnet density] is established. The magnet width denotes the length of the permanent magnet in a direction perpendicular to Lc. In FIG. 7, the ordinate denotes [Wc×R/Wm], and the abscissa denotes[W/Lc].

As illustrated in FIG. 7, it has been found chat [Wc×R/Wm] at which the percentage of the torque ripple to[W/Lc] is the same as or smaller than 0.5[%] is distributed in an inverse-proportion relationship. In other words, [Wc×R/Wm] is distributed within the range of [−30.3×W/Lc+{89±1.3}] with respect to[. Accordingly, when the shape of the rotor core 23a satisfies the equation below, it is made possible to realize a permanent-magnet motor having a small torque ripple.

$$[Wc \times R/Wm] = [-30.3 \times W/Lc + \{89 \pm 1.3\}]$$

It goes without saying that in the permanent-magnet motor according to foregoing Embodiment 1, the shape of the rotor core 23a may also satisfy the equation above.

The present invention is not limited to the respective permanent-magnet motors according to foregoing Embodiments 1 and 2; in the scope within the spirits of the present invention, the respective configurations of Embodiments 1 and 2 can appropriately be combined with each other, can partially be modified, or can partially be omitted.

INDUSTRIAL APPLICABILITY

A permanent-magnet motor according to the present invention can be applied to the field of an electric power steering apparatus to be mounted in a vehicle such as an automobile or to the automobile industry.

DESCRIPTION OF REFERENCE NUMERALS

2: permanent-magnet motor
21: output axle
22: stator
22a: stator core

22b: slot
22c: teeth
23: rotor
23a: rotor core
23b: first through-hole
23c: second through-hole
23d: magnetic-field pole
231: through-hole pair
41: permanent magnet
24: armature coil
24a: coil conductor
25: motor case
28: frame
29: bracket
40: rotor axle
51: first bearing
52: second bearing

The invention claimed is:

1. A permanent-magnet motor comprising:
a stator provided with a stator core having a plurality of teeth and a plurality of slots and an armature winding having a plurality of multiphase windings that are wound around the plurality of teeth and are contained in the plurality of slots; and
a rotor provided with a rotor core facing the stator core via a predetermined air gap, a plurality of permanent magnets embedded in the rotor core, and a plurality of magnetic-field poles,
wherein the plurality of permanent magnets form a plurality of permanent-magnet pairs in each of which end surface portions having a different polarity substantially face each other,
wherein each of the plurality of permanent-magnet pairs is configured with a pair of the permanent magnets that are arranged in a v-shaped manner in such a way that the distance between the portions of the plurality of permanent magnets, facing each other at the outer side in the radial direction of the rotor core, is smaller than a distance between the portions thereof, facing each other at the inner side in the radial direction of the rotor core, and
wherein a magnetic-field pole is formed of part, of the rotor core, that is situated between the adjacent permanent-magnet pairs,
wherein when it is assumed that R denotes the length of the outer circumference of the rotor core, Wc denotes the circumferential-direction maximum width, at the foregoing magnetic pole, of the rotor, Lc denotes the axle-direction length of the permanent magnet, Wm denotes the length of the permanent magnet in a direction perpendicular to the axle direction, and W denotes the total weight of the permanent magnets for forming one piece of the magnetic-field pole, the rotor is formed in such a way as to satisfy the equation below $$[-30.3 \times W/Lc + 89 - 1.3] \leq [Wc \times R/Wm \leq -30.3 \times W/Lc + 89 + 1.3].$$

2. The permanent-magnet motor according to claim 1, wherein at least part of the plurality of teeth are coupled with the respective adjacent teeth at an end portion, at a radial-direction central portion side, of the stator.

* * * * *